(12) United States Patent
Khan et al.

(10) Patent No.: US 12,124,437 B2
(45) Date of Patent: Oct. 22, 2024

(54) SYSTEMS AND METHODS FOR OFF-CHAIN ACTION ORCHESTRATION USING BLOCKCHAIN EVENTS

(71) Applicant: Verizon Patent and Licensing Inc., Basking Ridge, NJ (US)

(72) Inventors: Ahmed A. Khan, Plano, TX (US); Mohammed A. Qaudeer, Tampa, FL (US); Abdul Raheem, Irving, TX (US); David Szol, Owasso, OK (US); Rasmi Ranjan Samal, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 17/667,676

(22) Filed: Feb. 9, 2022

(65) Prior Publication Data

US 2023/0252023 A1   Aug. 10, 2023

(51) Int. Cl.
*G06F 16/24* (2019.01)
*G06F 16/242* (2019.01)
*H04L 9/00* (2022.01)

(52) U.S. Cl.
CPC ........ *G06F 16/243* (2019.01); *G06F 16/2445* (2019.01); *H04L 9/50* (2022.05)

(58) Field of Classification Search
CPC ....... G06F 16/243; G06F 16/2445; H04L 9/50
See application file for complete search history.

(56) References Cited

U.S. PATENT DOCUMENTS

| | | | | |
|---|---|---|---|---|
| 2017/0205827 | A1* | 7/2017 | Rezvani | G05D 1/02 |
| 2019/0013948 | A1* | 1/2019 | Mercuri | G06Q 20/3827 |
| 2019/0236559 | A1* | 8/2019 | Padmanabhan | H04L 9/3297 |
| 2020/0042958 | A1* | 2/2020 | Soundararajan | G06Q 20/401 |
| 2020/0118068 | A1* | 4/2020 | Turetsky | G06F 9/45558 |
| 2020/0167319 | A1* | 5/2020 | Fritz | H04L 41/30 |
| 2020/0382283 | A1* | 12/2020 | Irazabal | G06F 7/556 |
| 2021/0157788 | A1* | 5/2021 | Du | G06F 16/9024 |
| 2021/0174972 | A1* | 6/2021 | Pavlatos | G16H 10/60 |
| 2021/0250165 | A1* | 8/2021 | Crawford | H04L 9/3247 |
| 2021/0264520 | A1* | 8/2021 | Cummings | G06Q 40/12 |

(Continued)

OTHER PUBLICATIONS

Rejeb et al., "Leveraging the Internet of Things and Blockchain Technology in Supply Chain Management", Future Internet 2019, 11, 161. https://doi.org/10.3390/fi11070161 (Year: 2019).*

*Primary Examiner* — Hosain T Alam
*Assistant Examiner* — Robert F May

(57) ABSTRACT

A system described herein may identify a plurality of records recorded to a blockchain, and may identify a particular record of the plurality of records that includes a particular indicator that the particular record is associated with a particular event. The particular indicator may indicate a type of off-chain event. The system may perform, based on identifying the particular record that is associated with the particular event, one or more off-chain actions associated with the particular event. The performed off-chain event may be the indicated type, out of a plurality of possible types of events to perform. The system may record, to the blockchain, an indication that the one or more off-chain actions associated with the particular event have been performed. The event may include an identifier, which the system may also record to the indication that the one or more off-chain actions have been performed.

20 Claims, 12 Drawing Sheets

(56) References Cited

U.S. PATENT DOCUMENTS

| | | | |
|---|---|---|---|
| 2022/0092056 A1* | 3/2022 | Sekar | G06Q 10/10 |
| 2022/0094543 A1* | 3/2022 | Sekar | H04L 9/50 |
| 2023/0206231 A1* | 6/2023 | Saad | G06Q 20/4016 |
| | | | 705/75 |

* cited by examiner

SYSTEMS AND METHODS FOR OFF-CHAIN ACTION ORCHESTRATION USING BLOCKCHAIN EVENTS

BACKGROUND

Blockchains provide for the decentralized and secure storage of data. Blockchains may further provide for the immutability of recorded data, as data may not be altered once recorded to a blockchain. Organizations or other entities may store relatively large amounts of data, such as operational data, user data, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for the use of a blockchain to initiate the orchestration of off-chain events, such as the retrieval of data stored in off-chain repositories. The off-chain repositories may include databases, servers, datacenters, etc. that are independent of a blockchain that is used to orchestrate the retrieval of data from such repositories. Since the data is stored off-chain, the size or amount of data may be significantly greater than the amounts of data that may be feasibly stored in the blockchain (e.g., where such feasibility may be related to congestion of the blockchain, relatively high transaction fees or processing power associated with storing relatively large amounts of data to the blockchain, etc.). As such, the amount of data that may be stored and retrieved in accordance with some embodiments may be highly scalable. As discussed below, characteristics of the blockchain, such as the immutability, auditability, client-agnostic accessibility, and decentralized trust provided by the blockchain, may be leveraged to provide for the orchestration of off-chain events, such as the retrieval of data from an off-chain repository. As such, the orchestration of off-chain events may be done in a traceable and secure manner, such as by entities that have been authenticated in accordance with the blockchain.

While examples are provided below in the context of performing queries to off-chain repositories, similar concepts may be used for other types of off-chain actions. For example, such off-chain actions may include modifying configuration parameters of one or more Internet of Things ("IoT") devices, modifying configuration parameters of a wireless network (e.g., beamforming parameters, Quality of Service ("QoS") treatment parameters, queue weights, routing parameters, etc.), outputting alerts, controlling drones or autonomous vehicles, etc. Such actions may be performed based on parameters included in particular events recorded to a blockchain. For example, while such parameters are described below in the context of query parameters, in practice, the parameters included in such events may include rules, policies, configuration parameters, etc. associated with IoT devices, wireless networks, alerts, drone or autonomous vehicle control, and/or other types of parameters.

Figure 1A:
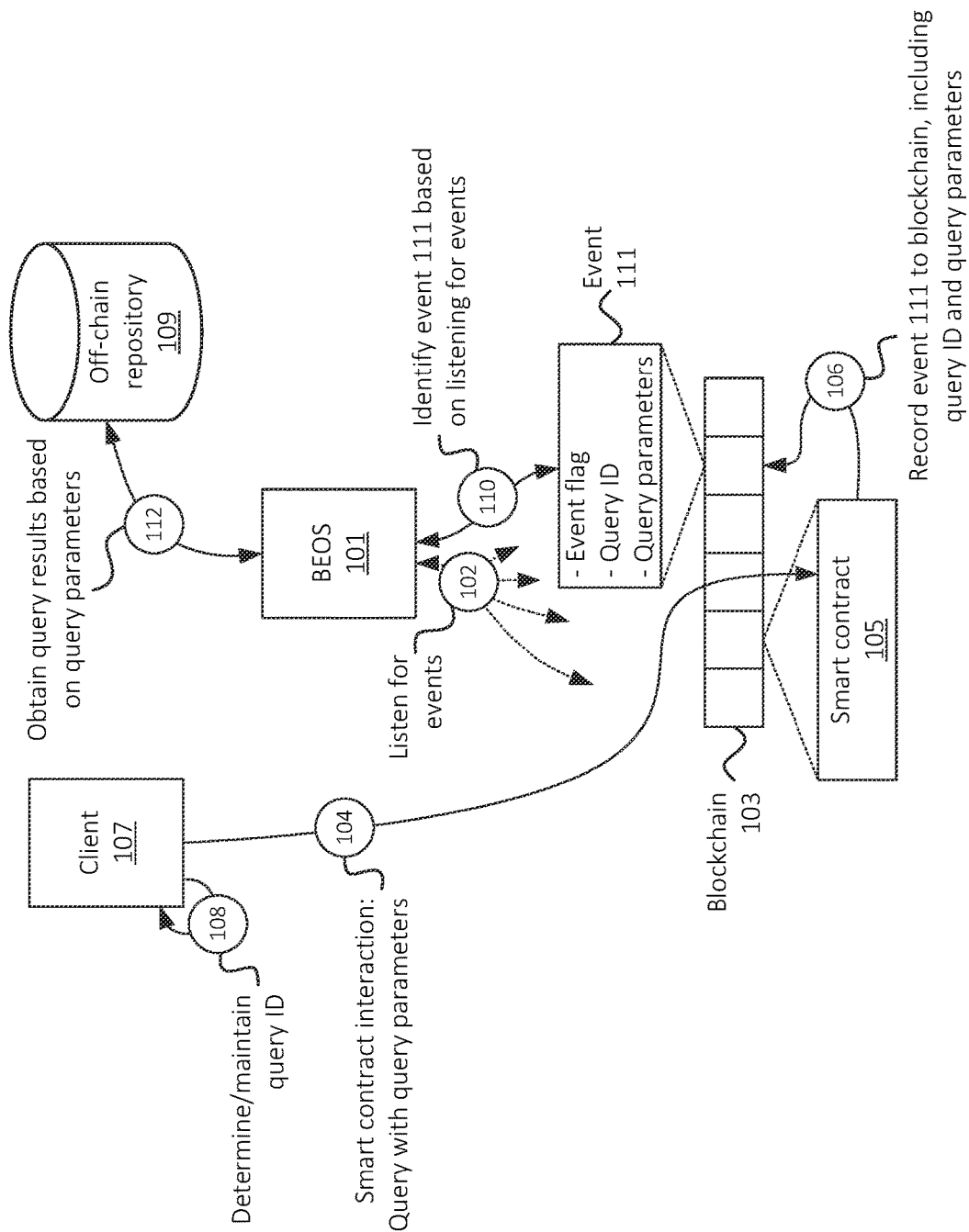
FIG. 1A illustrates an example of creating a blockchain event to trigger one or more off-chain actions, in accordance with some embodiments.

As shown in FIG. 1A, Blockchain Event Orchestration System ("BEOS") 101 may monitor, listen to, etc. (at 102) blockchain 103 for events. As discussed herein, an "event" may be associated with a recordation to blockchain 103 by one or more clients, smart contracts, etc. that are able to interact with blockchain 103, where such interactions include the creation and/or recordation of records, blocks, etc. to blockchain 103. Blockchain 103 may, in some embodiments, be a decentralized set of nodes, validators, or other elements that communicate with each other to maintain a distributed, immutable ledger (e.g., set of blocks, records, etc.). In some embodiments, blockchain 103 may verify or maintain the ledger using one or more suitable consensus mechanisms, such as proof of stake, proof of work, and/or other suitable probabilistic or deterministic protocols. BEOS 101 may include or may be communicatively coupled to a block explorer or other device or system that accesses blockchain 103 and identifies information recorded to blockchain 103. In some embodiments, BEOS 101 may monitor (at 102) blockchain 103 on a periodic basis or some other ongoing basis in order to identify records that are recorded to blockchain 103 on an ongoing basis. For example, BEOS 101 may subscribe to be a "listener" for events from blockchain activities, such that when such activities occur, an event communication is sent to or otherwise detected by BEOS 101.

In some embodiments, BEOS 101 may be configured to perform particular off-chain actions, such as outputting a query, controlling an IoT device, etc., based on detecting events or other suitable types of indications associated with recordations to blockchain 103. For example, BEOS 101 may receive, from an administrator or other authorized entity associated with BEOS 101, information indicating particular actions to perform based on detecting different types of events or indications recorded to blockchain 103. As discussed herein, such different types of events or indications may be associated with different "flags" or other indicators. For example, BEOS 101 may receive a mapping between a particular flag (e.g., an "event" flag, a "query" flag, an "IoT control" flag, etc.) and a particular action or set of actions to perform.

Blockchain 103 may include one or more smart contracts, such as smart contract 105, which may be used to facilitate the orchestration of off-chain events, as discussed herein.

Client 107 may be or may include a device or system that has access to blockchain 103, such as a "wallet" or other type of entity associated with blockchain 103. For example, client 107 may be or include an application that has access to blockchain 103 through an account (e.g., an address) associated with an entity associated with client 107. In some embodiments, client 107 may include or have access to a set of private keys or other security mechanism, generated in coordination with blockchain 103, that may be used to sign interactions with blockchain 103, where such signing indicates authorization by an entity associated with client 107 (e.g., a "user") to perform such interactions.

In some embodiments, such interactions may include initiating access to off-chain repository 109, which may include one or more devices or systems that store data that is separate from blockchain 103. For example, while blockchain 103 may be implemented by a set of nodes that perform computations and/or communicate with each other in order to implement blockchain 103, off-chain repository 109 may operate independently of blockchain 103 and may, in some embodiments, not communicate directly with blockchain 103 or with nodes that implement blockchain 103.

Off-chain repository 109 may, for example, be associated with a first entity, while client 107 is associated with a second entity. For example, the first and second entities may be enterprises, corporations, users, etc. that maintain separate sets of data. The second entity (e.g., associated with client 107) may be authorized, in some instances, to access some or all of the data associated with the first entity (e.g., stored in off-chain repository 109), such as by submitting queries for requested data. As described herein, such queries may be submitted by interacting with blockchain 103 (e.g., by interacting with smart contract 105).

Figure 1B:
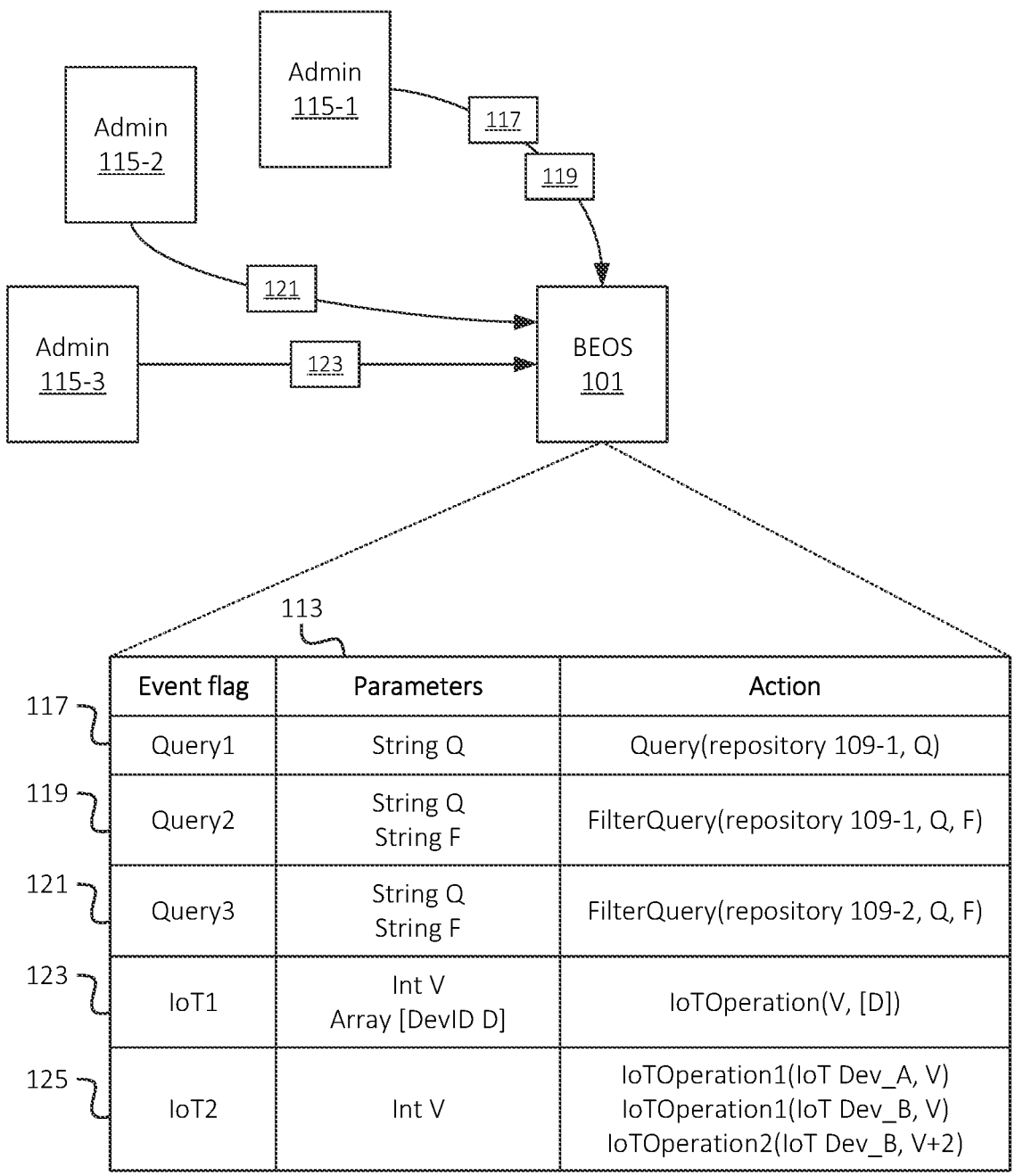
FIGS. 1B and 1C illustrate example definitions of blockchain events, in accordance with some embodiments.

As shown in FIG. 1B, BEOS 101 may maintain data structure 113, which may include a mapping of different types of events (e.g., event flags) to particular sets of parameters and/or actions. For example, a particular record of data structure 113 may specify a particular event type or flag, and one or more actions to take when such event type or flag is detected. In some embodiments, each record of data structure 113 may also include a set of parameters, which may be used when performing suitable actions.

In the example of FIG. 1B, data structure 113 includes example records 117, 119, 121, 123, 125, and/or one or more other records. For example, record 117 may indicate that the flag "Query1" is associated with a string (e.g., set of characters) "Q." This parameter (e.g., the string "Q") may be, for example, a set of query terms. Further, the action indicated by record 117 may be a query performed on a particular off-chain repository 109 (e.g., off-chain repository 109-1, in this example). In other words, the "Query1" flag may be associated with a query to be performed on off-chain repository 109-1.

Record 119 may indicate that the flag "Query2" is associated with two strings "Q" and "F," and that the action to be performed is a query to off-chain repository 109-1 based on the strings "Q" and "F." In particular, the query may be a query using "Q" as a search term and "F" as a filter, and the particular type of query may be referred to as a "FilterQuery" (or other suitable name). In other words, the "Query2" flag may be associated with a query to be performed on off-chain repository 109-1, with a set of filters or other suitable query parameters.

Record 121 may indicate that the flag "Query3" is associated with two strings "Q" and "F," and that the action to be performed is a query to off-chain repository 109-2 based on the strings "Q" and "F." This action may, for example, be the same action specified in record 119, but performed with respect to a different device or system (e.g., off-chain repository 109-2 as opposed to off-chain repository 109-1).

Record 123 may indicate that the flag "IoT1" is associated with an integer "V" and an array of "DevID" type objects. For example, the "DevID" objects may refer to particular devices, such as IoT devices, and may include alphanumeric identifiers, names, addresses, and/or other suitable identifiers of particular IoT devices or other types of devices. The integer "V" may be a value, such as a temperature, speed, or other configurable parameter that may be adjusted or set with respect to the set of IoT devices. The action "IoTOperation" may include configuring the specified set of IoT devices with the value "V" and/or otherwise outputting the value "V" to the specified set of IoT devices.

Record 125 may indicate that the flag "IoT2" is associated with an integer "V," and may further specify multiple actions to perform. The actions may include performing a first operation ("IoTOperation1") with the parameter "V" to a first IoT device ("IoT Dev A") and a second IoT device ("IoT Dev B"). For example, this first action may include setting a particular value, such as a minimum temperature associated with these two IoT devices, to "V." Record 125 may further indicate that a second operation ("IoTOperation2") is to be performed with the parameter "V+2" (e.g., the value "V" plus 2) with respect to the second IoT device. For example, this second action may include setting another value, such as a maximum temperature associated with the second IoT device, to "V+2."

As such, each event flag may be associated with one or more parameters, as well as one or more actions to perform when an event with a given event flag is detected. In some embodiments, the external systems, such as off-chain repositories 109, IoT devices, etc., on which such actions are to be performed may be configurable (e.g., specified as parameters) or may be "hard-coded" (e.g., statically associated with particular event flags). In some embodiments, entities (e.g., admins 115-1, 115-2, 115-3, and/or other suitable entities) associated with such external systems (e.g., off-chain repositories 109, IoT devices, etc.) may provide authentication keys, credentials, and/or other suitable security mechanisms via which BEOS 101 may communicate with such external systems.

In some embodiments, data structure 113 may include some or all of the same information as one or more smart contracts 105. For example, a given smart contract 105 may include a condition or other logic indicating that the event flag "Query1" is associated with a string as an input, that the event flag "Query2" is associated with two strings as inputs, that the event flag "IoT1" is associated with an integer and an array as inputs, etc.

Figure 1C:
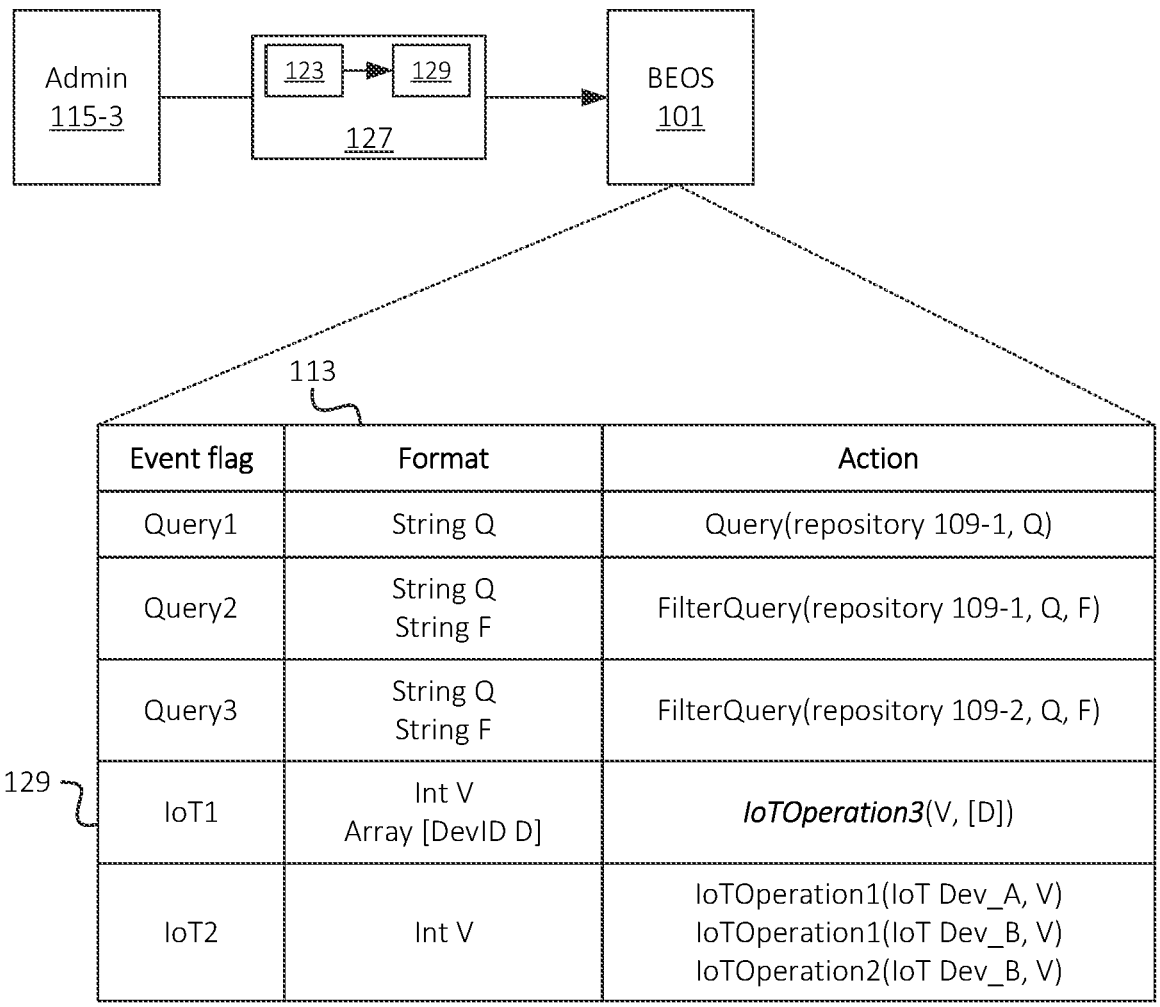

As shown in FIG. 1C, the information in data structure 113 may be dynamically updated, such that the actions and/or parameters may be modified without the need to modify blockchain 103 and/or smart contracts 105. For example, admin 115-3 may provide modification 127, which may include a modification to record 123 (thus yielding modified record 129). As shown, modified record 129 may specify a different operation to be performed than previous record 123 (e.g., "IoTOperation3" instead of "IoTOperation").

Returning to FIG. 1A, client 107 may interact (at 104) with smart contract 105 in order to access off-chain repository 109, such as to output a query to off-chain repository 109 for which off-chain repository 109 may provide query results. For example, a user associated with client 107 may wish to access information stored in off-chain repository 109, such as information matching certain query parameters, such as keywords, search terms, attributes, conditions, or other parameters. Smart contract 105 may be specified such that a type of event or interaction may be specified as an input to smart contract 105, such as a "query" type of interaction, an "IoT control" type of interaction, etc. In some embodiments, smart contract 105 may be a smart contract associated with queries, and accordingly any interaction with smart contract 105 may be considered as a query. In some embodiments, smart contract 105 may be specified such that query parameters may be specified as an input to smart contract 105. As such, the interaction (at 104) with smart contract 105 may include specifying, by client 107, one or more query parameters (e.g., keywords, search terms, etc.) as an input for smart contract 105. In other examples, other smart contracts may be associated with other types of off-chain actions, such that client 107 may not need to specify a particular type of event to record to blockchain 103. For example, client 107 may interact with another smart contract that is associated with controlling IoT devices in situations where client 107 outputs configuration parameters for a given IoT device.

In some embodiments, the interaction (at 104) may be a direct interaction between client 107 and smart contract 105. In some embodiments, one or more applications, devices, systems, etc. may provide a front-end interface, such as an application programming interface ("API") or user interface ("UI"), via which client 107 may specify query terms or other inputs, and such applications, devices, systems, etc. may interact with smart contract 105 on behalf of client 107. In some embodiments, one or more decentralized applications ("dApps") may be deployed using blockchain 103 and/or may otherwise communicate with blockchain 103 in order to interact (at 104) with smart contract 105 based on a request from client 107.

Smart contract 105 may, based on the interaction (at 104), record (at 106) an event to blockchain 103. For example, smart contract 105 may generate a record, referred to as event 111, to blockchain 103. Event 111 may include a flag, indicator, etc. that the record is an "event," such that BEOS 101 may identify the event based on the monitoring (at 102) discussed above. For example, BEOS 101 may monitor blockchain 103 for records having the "event" flag, indicator, etc. (referred to herein simply as "flag" for the sake of brevity). In some embodiments, the event flag may include the word "event" or some other word, phrase, string, etc. In some embodiments, the event flag may include a code or other value that may be used to specify that the record is an event (e.g., "Query1," "Query2," "IoT1," etc., as discussed above). In some embodiments, the event flag may be, or may be derived from, an address or other identifier of smart contract 105. In some embodiments, the event flag may specify a type of event, such as a query. In some embodiments, the event flag may specify that the query is a query to off-chain repository 109 (e.g., where different flags may be associated with different resources to query).

In some embodiments, event 111 may include a query identifier, associated with the interaction (at 104). In some embodiments, the query identifier may be, or may be based on, a transaction identifier associated with the interaction (at 104) and/or the recording (at 106) of event 111 to blockchain 103. Event 111 may further include some or all of the query parameters provided by client 107. As such, event 111 may be recorded onto blockchain 103 as a query with such query parameters. In some embodiments, event 111 may include additional or different information, such as an identifier (e.g., an address or other identifier) of client 107, a time at which client 107 interacted with smart contract 105, a time at which smart contract 105 recorded event 111 to blockchain 103, an identifier of off-chain repository 109, etc. In some embodiments, BEOS 101 may determine an identifier of client 107 without event 111 explicitly including such identifier of client 107. For example, client 107 may, based on one or more transaction records associated with interactions 104 and/or 106, determine that interactions 104 and/or 106 are associated with client 107, where such records include an identifier of client 107 (e.g., an address of client 107 with respect to blockchain 103). In some embodiments, event 111 may include an explicit indicator of an identifier of client 107 (e.g., smart contract 105 may include such indicator in event 111).

Client 107 may further determine and/or maintain (at 108) the query identifier discussed above. For example, client 107 may receive a confirmation from smart contract 105 that event 111 was created, where such confirmation includes the query identifier (e.g., a transaction identifier associated with the recordation of event 111 to blockchain 103). In some embodiments, smart contract 105 may provide the query identifier to a dApp or other application, device, or system via which the interaction (at 104) was performed, in embodiments where such dApp or other application, device, or system performed such interaction. As discussed below, the query identifier may be used to identify a response to the query, when such response is provided.

As further shown in FIG. 1A, BEOS 101 may identify (at 110) event 111 based on monitoring blockchain 103 for events. For example, as discussed above, BEOS 101 may identify event 111 based on the event flag included in event 111. BEOS 101 may determine that event 111 is associated with a query type of action based on information (e.g., data structure 113 or other suitable information) associating the particular event flag, smart contract 105, and/or an event type included in event 111 to a query action. Further, event 111 may determine that the query should be performed on off-chain repository 109 (e.g., as opposed to some other resource) based on smart contract 105 (e.g., where smart contract 105 is associated with off-chain repository 109, and other smart contracts are associated with other resources), based on an identifier of client 107 (e.g., where client 107 is associated with off-chain repository 109 as opposed to other resources), an indication of off-chain repository 109 included in event 111 (e.g., where client 107 indicates an identifier of off-chain repository 109 in the smart contract interaction), etc.

BEOS 101 may obtain (at 112) query results from off-chain repository 109 based on the query parameters. For example, BEOS 101 may output a query to off-chain repository 109 that includes some or all of the parameters. In some embodiments, BEOS 101, off-chain repository 109, and/or some other device or system that searches off-chain repository 109 may reformat the query parameters into a suitable format (e.g., a particular database language, a particular query format, etc.) such that off-chain repository 109 may be searched based on such query terms. Off-chain repository 109 may return such results to BEOS 101, where such results include data maintained by off-chain repository 109 that matches the query terms. In some embodiments, when submitting a query to off-chain repository 109, BEOS 101 may include the query identifier, and off-chain repository 109 may return the results with the query identifier. Additionally, or alternatively, BEOS 101 may use some other suitable technique to determine that the results provided (at 112) by off-chain repository 109 are associated with the query identifier.

BEOS 101 may communicate with off-chain repository 109 via an API or other suitable communication pathway. In this example, BEOS 101 is communicatively coupled to one particular off-chain repository 109. In some embodiments, BEOS 101 may be communicatively coupled to multiple instances of off-chain repository 109, and/or to multiple different repositories 109. In such embodiments, as discussed below, BEOS 101 may select one or more such repositories to query based on the request from client 107. As further discussed below, BEOS 101 may determine whether client 107 is authorized to access off-chain repository 109 prior to obtaining (at 112) the query results, in order to prevent access by unauthorized parties. As discussed below with respect to FIGS. 2-4, BEOS 101 may provide the results to client 107 using one or more response techniques.

Figure 2:
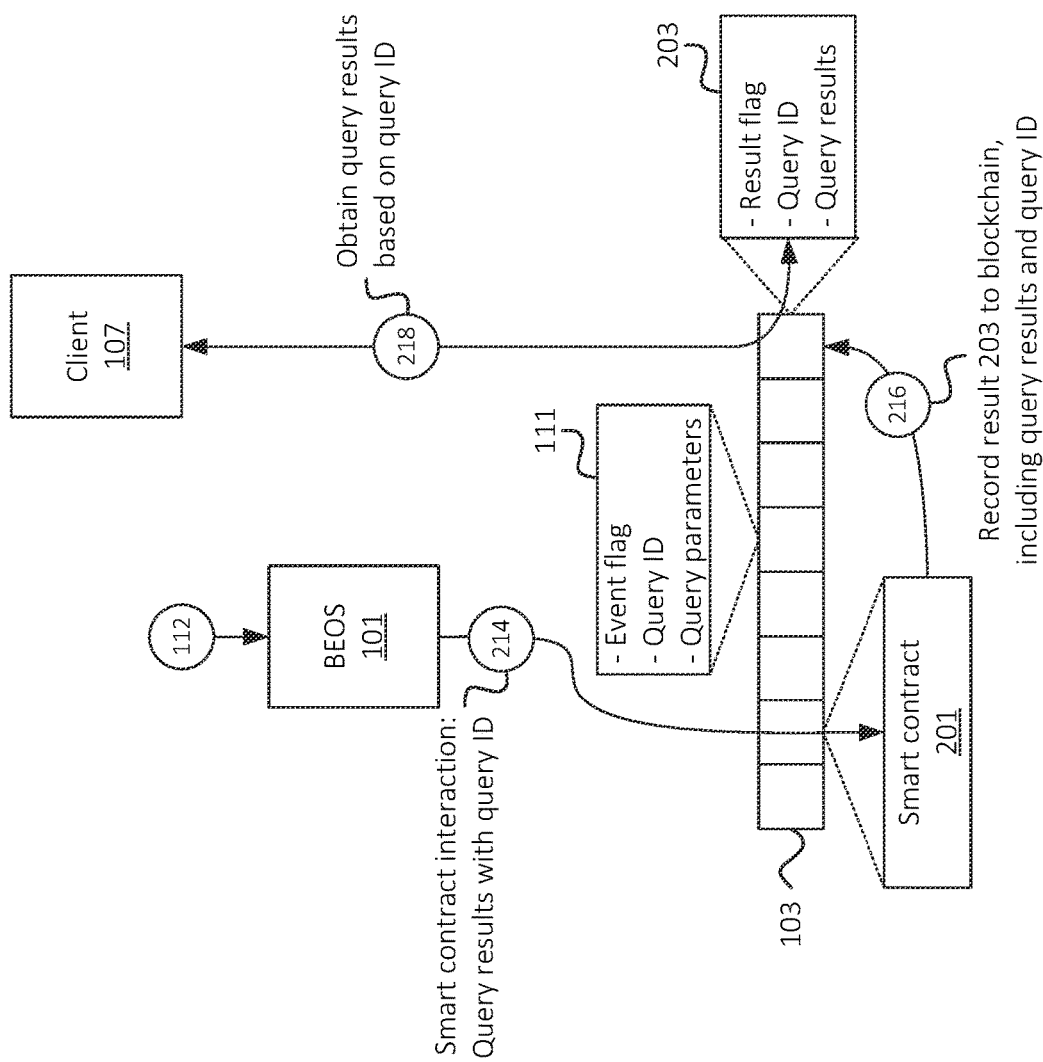
FIGS. 2-4 illustrates an example of performing the one or more off-chain actions and recording an indication to the blockchain that the one or more off-chain actions have been performed, in accordance with some embodiments.
Figure 3:
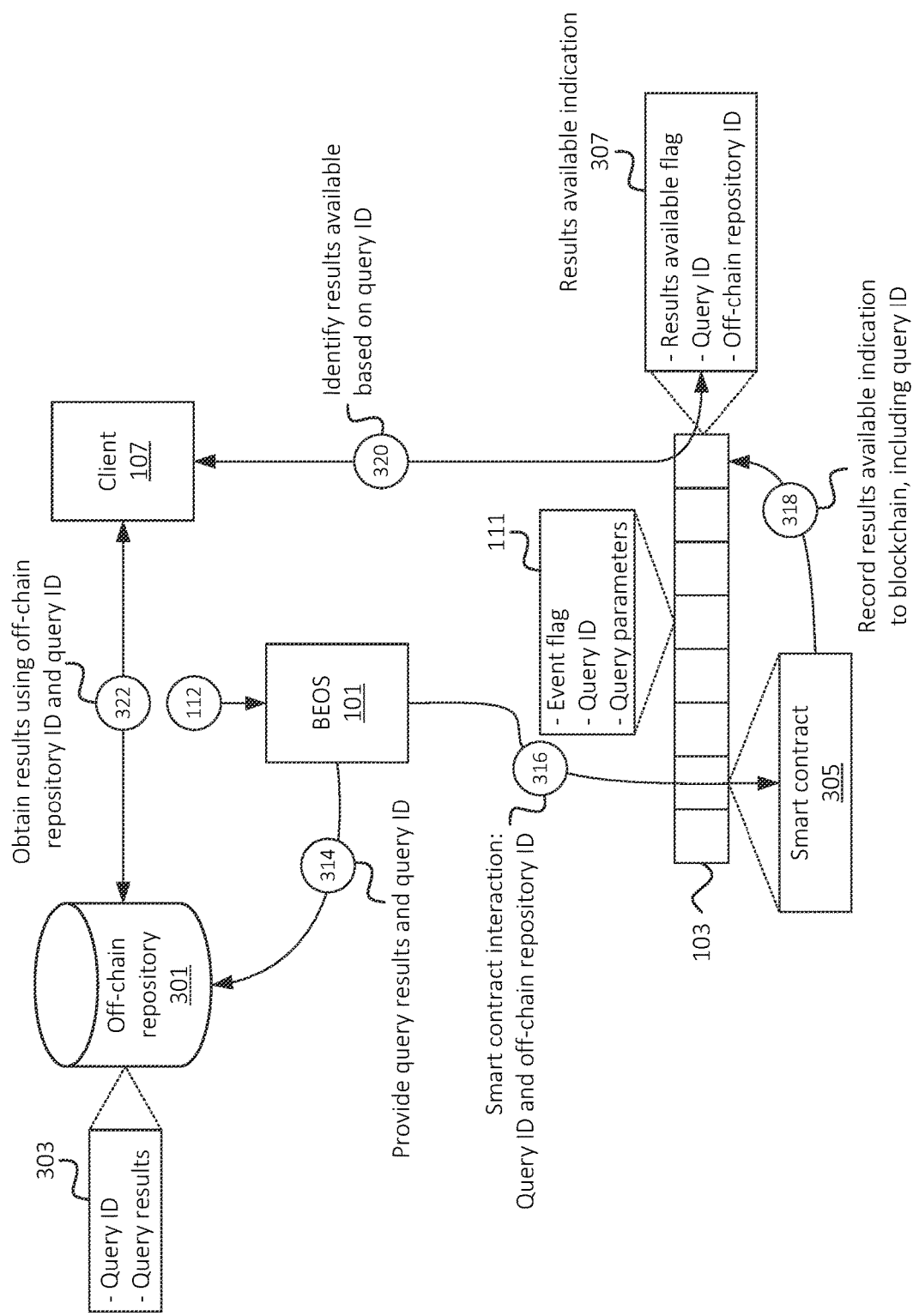

As shown in FIG. 2, for example, once BEOS 101 receives (at 112) the query results, BEOS 101 may interact (at 214) with smart contract 201 in order to record the results to blockchain 103. For example, smart contract 201 may specify one or more inputs, such as a first input for query results and a second input for a query identifier. The interaction (at 214) may include some or all of the query results received from off-chain repository 109, as well as the query identifier associated with the query from client 107. In some embodiments, BEOS 101, off-chain repository 109, and/or some other suitable device or system may reformat, sanitize, compress, cleanse, etc. the search results prior to interacting with smart contract 201. For example, such results may be reformatted based on one or more user preferences or configurations associated with client 107. As another example the results may be compressed based on the data size of the results, such as by eliminating a quantity of results that are above a threshold quantity, by performing one or more suitable compression techniques, etc. In some embodiments, other types of reformatting or other operations may be performed based on preferences or configs associated with client 107 or off-chain repository 109, based on the contents of the results, and/or other factors.

In some embodiments, smart contract 201 may be the same smart contract as smart contract 105, or may be a different smart contract. In instances where smart contract 105 and smart contract 201 are the same smart contract, the interaction (at 104) may specify that such interaction is submitting a query with particular query parameters, while the interaction (at 214) may specify that such interaction is providing query results.

Smart contract 201 may record (at 216) result 203 to blockchain 103. For example, smart contract 201 may create a record on blockchain 103 that includes a "result" flag. For example, as similarly discussed above, such flag may include the word "result" or some other word, phrase, etc. based on which such record may be identified as including query results. In some embodiments, such flag may include an identifier of smart contract 201.

The record (e.g., result 203) may further include the query identifier provided by BEOS 101. Client 107 may accordingly obtain (at 218) the results to the query (provided at 104) by accessing result 203 as recorded to blockchain 103. For example, client 107 may include and/or may be communicatively coupled to a block explorer, a dApp, or other type of application, device, or system that accesses information stored in blockchain 103. For example, client 107 or other suitable application, device, or system may determine that result 203 includes a result flag, and is therefore includes a set of query results. Client 107 may further identify that result 203 is associated with the particular query provided (at 104) by client 107 by determining that the query identifier included in result 203 matches the query identifier associated with the initial query and/or with event 111. In this manner, client 107 may receive such results without needing to directly interact with off-chain repository 109. Further, the use of smart contracts (e.g., smart contracts 105 and/or 201) on blockchain 103 may allow for such smart contracts to act as an orchestrator for off-chain operations, such as the retrieval of information from off-chain repository 109.

As noted above, FIG. 3 illustrates another example of providing results, received from off-chain repository 109, to client 107 (e.g., based on a query from client 107). As shown, once BEOS 101 receives (at 112) the results from off-chain repository 109, BEOS 101 may provide (at 314) the query results, along with the query identifier, to a different off-chain repository 301. For example, off-chain repository 109 and off-chain repository 301 may be maintained by different entities, may have separate authentication protocols, may be associated with different hardware or cloud systems, etc. Off-chain repository 301 may, for instance, be accessible by client 107 via one or more suitable authentication techniques, while off-chain repository 109 may not be accessible by client 107. In other words, client 107 may be able to access off-chain repository 301, but may not be able to access off-chain repository 109.

Off-chain repository 301 may record the provided query results as record 303, which may include the query identifier and the query results. BEOS 101 may also interact with smart contract 305 in order to indicate that the results have been recorded to off-chain repository 301. As similarly discussed above, smart contract 305 may be the same smart contract as smart contract 105 and/or smart contract 201, or may be a different smart contract. Smart contract 305 may specify inputs, such as a query identifier and/or an identifier of an off-chain repository to which results for a given query have been recorded. As such, BEOS 101 may provide (at 316), as input to smart contract 305, the query identifier and an identifier of off-chain repository 301, such as a name or label of off-chain repository 301, a Uniform Resource Locator ("URL") associated with off-chain repository 301, an Internet Protocol ("IP") address of off-chain repository 301, and/or some other suitable identifier. In some embodiments, BEOS 101 may not provide (at 316) an identifier of off-chain repository 301, such as situations in which client 107 does not need such identifier in order to determine that the results have been recorded to off-chain repository 301 (e.g., as opposed to having been recorded to some other resource). For example, in some embodiments, particular clients 107 may be associated with or mapped to particular off-chain repositories, and such clients 107 may be able to identify the suitable off-chain repositories based on such associations or mappings.

Smart contract 305 may accordingly record (at 318) a record to blockchain 103 (e.g., indication 307), indicating that that a result is available for the query provided by client 107. The record may include a "results available" flag, based on which client 107 and/or some other entity may identify that the record is an indication 307 that query results are available. Indication 307 may further include the query identifier, based on which the particular query associated with the results may be identified (at 320), as well as the identifier of off-chain repository 301. In some embodiments, as discussed above, the identifier of off-chain repository 301 may be omitted, such as instances in which client 107 is able to determine in some other manner a resource (such as off-chain repository 301 or some other resource) from which the results may be obtained.

Client 107 may obtain (at 322) the results from off-chain repository 301. For example, based on accessing blockchain 103 to identify indication 307 of the available results, client 107 may identify off-chain repository 301 as well as the query identifier associated with the results. Additionally, or alternatively, as discussed above, client 107 may be preconfigured, registered, etc. to communicate with off-chain repository 301, such that client 107 may not need to receive an identifier of off-chain repository 301 in indication 307. Client 107 and off-chain repository 301 may communicate via an API or other suitable communication pathway in order for client 107 to receive the results, stored in record 303, from off-chain repository 301. In some embodiments, as discussed further below, off-chain repository 301 and/or some other device or system may authenticate client 107 and/or determine whether client 107 is authorized to receive the results prior to providing (at 322) such results.

Figure 4:
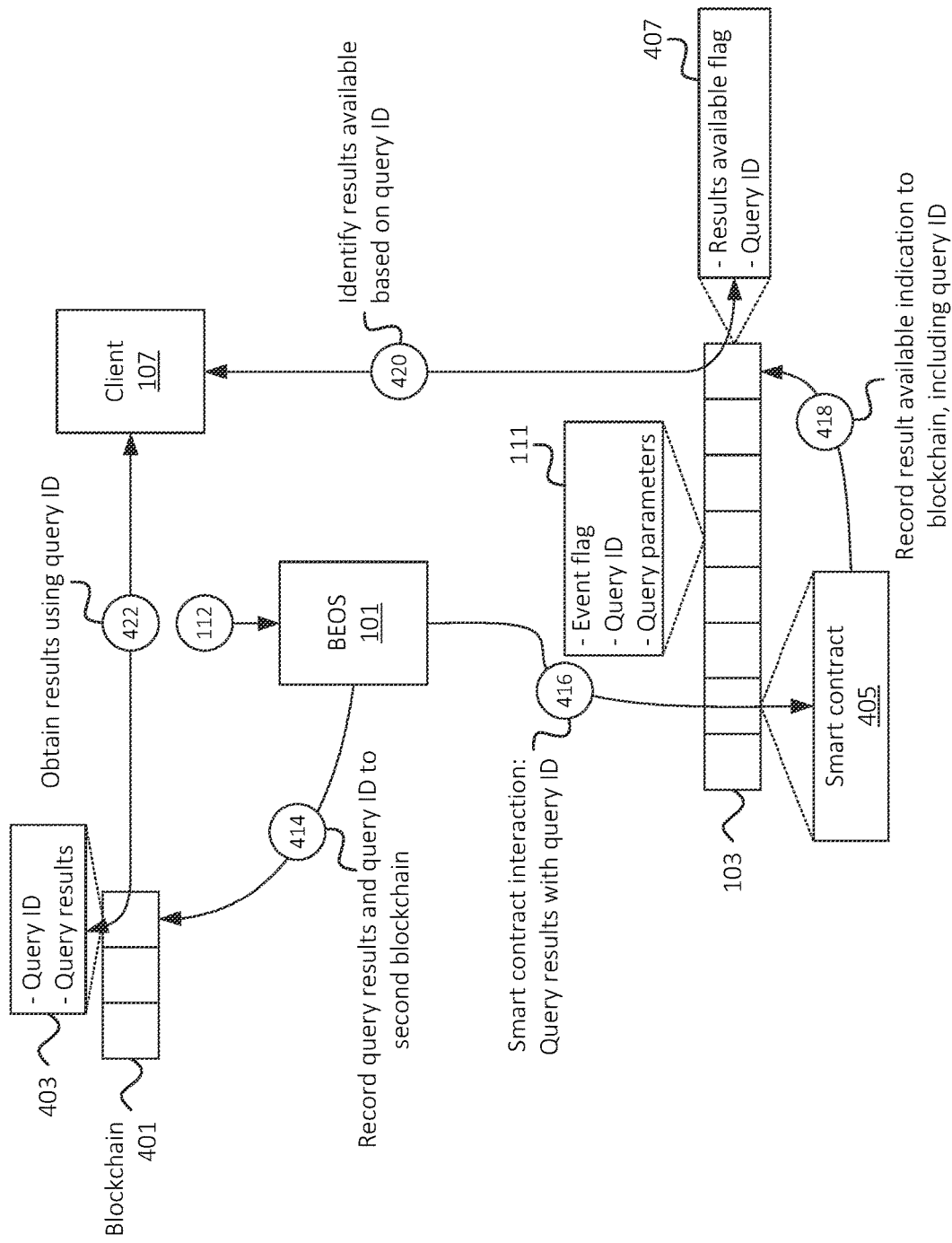

In the example of FIG. 4, the results may be recorded to a different blockchain 401 than blockchain 103. For example, blockchain 401 may be implemented via different nodes than blockchain 103, may be a "private" blockchain to which client 107 and other authorized entities have access (e.g., some entities may have access to blockchain 103 but not to blockchain 401), and/or may otherwise be distinct from blockchain 103. In some embodiments, BEOS 101 may have access to both blockchain 103 and blockchain 401. Similarly, client 107 may also have access to both blockchain 103 and blockchain 401.

As shown, for example, BEOS 101 may record (at 414) query results and the query identifier (received at 112) to blockchain 401. In some embodiments, BEOS 101 may interact with one or more smart contracts deployed on blockchain 401 in order to record such information to blockchain 401. As a result of the interaction (at 414), blockchain 401 may maintain record 403, with the query results and the query identifier.

BEOS 101 may further interact (at 416) with smart contract 405 in order to record the query results, which may include providing the query results with a query identifier, as discussed above. Smart contract 405 may record (at 418) indication 407 to blockchain 103, which may include a "results available" flag as well as the query identifier. In some embodiments, indication 407 may include a chain identifier associated with blockchain 401, a transaction identifier associated with the recording (at 414) of the results to blockchain 401, or some other information based on which blockchain 401 and/or record 403 may be identified. Client 107 may monitor blockchain 103, receive information via a dApp, and/or otherwise identify (at 420) that results for the query, associated with the query identifier, are available.

Client 107 may accordingly obtain (at 422) the results from blockchain 401. For example, client 107 may include and/or may be communicatively coupled to a block explorer or other application, device, or system that has access to blockchain 401. For example, as noted above client 107 may be associated with an address of blockchain 401, may be associated with an authentication system that controls access to blockchain 401, and/or may otherwise have access to records stored in blockchain 401. Blockchain 401 may identify record 403 based on the previously stored (e.g., at 108) query identifier.

Figure 5:
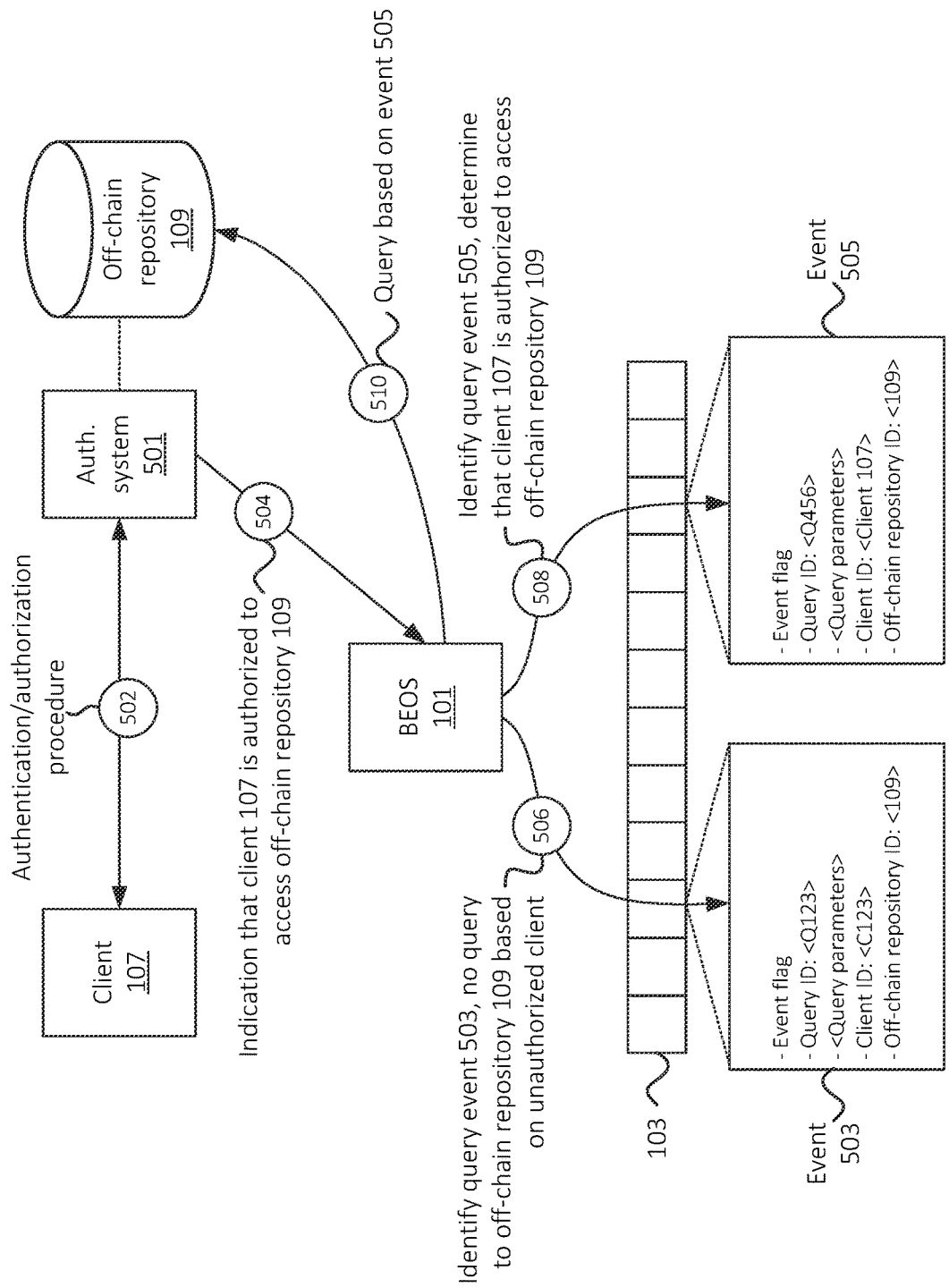
FIGS. 5 and 6 illustrate examples of determine whether to perform off-chain actions based on blockchain events based on whether a requestor associated with such events are authorized to request the off-chain actions, in accordance with some embodiments.

As discussed above, client 107 may be authenticated and/or registered for authorization to access off-chain repository 109, off-chain repository 301, and/or some other resource to which query results are provided. As shown in FIG. 5, for example, off-chain repository 109 may be associated with authentication system 501, which may control access to off-chain repository 109 based on queries submitted by client 107 and/or other sources. Authentication system 501 and client 107 may communicate (at 502) with each other to perform an authentication and/or authorization procedure. Any suitable authentication technique may be used to authenticate client 107, such as username and password techniques, biometric techniques, cryptographic key exchange techniques, wireless network-assisted authentication techniques, blockchain-assisted authentication techniques (e.g., where client 107 provides a digital signature in coordination with blockchain 103 and/or one or more other blockchains), etc. In some embodiments, authentication system 501 may determine particular query parameters that client 107 is authorized to use, such as particular fields, records, data types, query terms, etc. of off-chain repository 109 that client 107 is authorized to access.

As part of the authentication and/or authorization procedure (at 502) authentication system 501 may receive and/or otherwise determine an identifier of client 107, such as an address of blockchain 103 with respect to blockchain 103. Authentication system 501 may determine that client 107 is authorized to access off-chain repository 109 based on one or more rules or policies, authorization information provided by an administrator or other entity associated with authentication system 501 or off-chain repository 109, etc.

Once client 107 has been determined as being authorized to access off-chain repository 109, authentication system 501 may provide (at 504) an indication to BEOS 101 that client 107 is authorized to access off-chain repository 109. The indication may include one or more identifiers of client 107, such as an address of client 107 (e.g., an address of client 107 with respect to blockchain 103) or some other identifier. The indication may include rules, policies, and/or some other indication of query parameters that client 107 is authorized to use when querying off-chain repository 109 in the manner described herein (e.g., via blockchain 103).

As further shown, BEOS 101 may identify (at 506 and 508) one or more query events 503 and 505 that have been recorded to blockchain 103. For example, as discussed above, BEOS 101 may make such identifications based on monitoring, or listening to, blockchain 103 for events (e.g., records with a suitable event flag or other type of indicator). As noted above, events 503 and 505 may be associated with particular clients that have issued queries for information stored by off-chain repository 109. As such, events 503 and 505 are shown here as each including a respective "Client ID." Event 503 may be associated with (e.g., based on a query submitted by) a client other than client 107, which may be associated with a first identifier represented in the figure as "C123." Event 505 may be associated with client 107, and may include an identifier associated with client 107, such as an address that is native to blockchain 103.

BEOS 101 may identify (at 506) event 503, and may further identify that event 503 is associated with the client having an identifier represented by "C123." Assume in this example that this client is not authorized to access off-chain repository 109. For example, such client may not have participated in an authentication and/or authorization procedure with authentication system 501, authentication system 501 may have revoked the client's authorization to access off-chain repository 109, and/or BEOS 101 may otherwise receive information that the client is not authorized to access off-chain repository 109. Additionally, or alternatively, BEOS 101 may have received information that the client is not authorized to make certain types of queries, which may be reflected in the query parameters of event 503. Accordingly, BEOS 101 may refrain from, forgo, etc. querying off-chain repository 109 based on event 503. In other words, event 503 may be an unauthorized query, and BEOS 101 may take no action with respect to off-chain repository 109 based on such unauthorized query.

On the other hand, BEOS 101 may determine (at 508) that client 107 is authorized to access off-chain repository 109 (e.g., that event 505 is an authorized query), and may accordingly query (at 510) off-chain repository 109 based on event 505. Once BEOS 101 issues (at 510) the query to off-chain repository 109, BEOS 101 may receive query results from off-chain repository 109 and may provide, publish, output, etc. such query results, such as using one or more techniques described above with respect to FIGS. 3-5.

Figure 6:
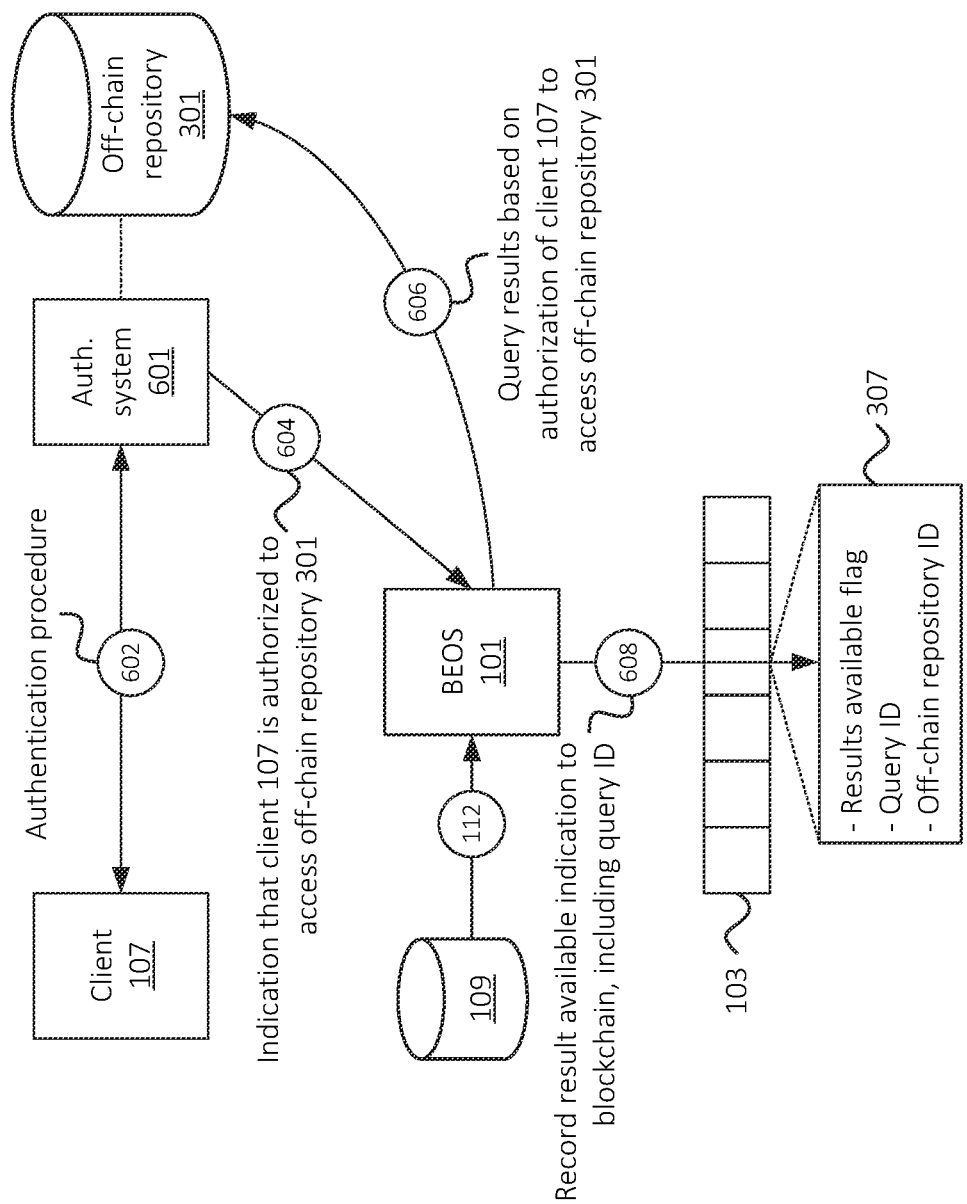

As shown in FIG. 6, off-chain repository 301 may be associated with authentication system 601, which may control access to off-chain repository 301 based on queries submitted by client 107 and/or other sources. In some embodiments, authentication system 601 may be the same device or system as authentication system 501, or may be a different, independent device or system from authentication system 501. As similarly discussed above, authentication system 601 and client 107 may communicate (at 602) with each other to perform an authentication and/or authorization procedure, based on which authentication system 601 may determine that client 107 is authorized to access off-chain repository 301. Authentication system 601 may output (at 604) an indication to BEOS 101 that client 107 is authorized to access off-chain repository 301. This indication may be used by BEOS 101 to determine whether BEOS 101 is authorized to record query results, based on a query from client 107, to off-chain repository 301. Additionally, or alternatively, such indication may be used by BEOS 101 to determine whether BEOS 101 is authorized to record a results available record, based on a query from client 107, to blockchain 103.

In some embodiments, different clients may be associated with different off-chain repositories. As such, authentication system 601 may further maintain information indicating which clients are authorized to access which off-chain repositories. For example, authentication system 601 may maintain a mapping between one or more identifiers of clients to one or more identifiers of off-chain repositories. In this manner, a first client may be authorized to access a first off-chain repository and not a second off-chain repository, while a second client may be authorized to access the second off-chain repository and not the first off-chain repository.

BEOS 101 may receive or obtain (at 112) a set of query results from off-chain repository 109 in a manner similarly described above (e.g., based on a query from client 107). BEOS 101 may determine that the query result is associated with client 107. For example, as discussed above, BEOS 101 may identify that client 107 is associated with the query identifier included in the results based on one or more transaction records associated with the query from client 107, and/or some other suitable manner. For instance, blockchain 103 may include one or more records that link client 107 with the query identifier, and/or may otherwise include one or more records based on which the association between client 107 and the query identifier may be determined.

Based on determining that client 107 is authorized to access off-chain repository 301, BEOS 101 may provide (at 606) the query results to off-chain repository 301 (e.g., including the query identifier, as discussed above with respect to FIG. 3). BEOS 101 may also record (at 608) a results available indication 307 to blockchain 103, as discussed above. As such, client 107 may identify indication 307 and retrieve the results from off-chain repository 301, as also discussed above.

In situations where BEOS 101 receives (e.g., at 112) a query result and determines that a client that made the query is not authorized to access off-chain repository 301, BEOS 101 may forgo or refrain from providing such results to off-chain repository 301. Additionally, or alternatively, BEOS 101 may forgo or refrain from recording a results available indication to blockchain 103. In some embodiments, in such situations, BEOS 101 may record a record to blockchain 103, including the query identifier, indicating that the query was unauthorized and that results are accordingly not being provided to the requestor.

Figure 7:
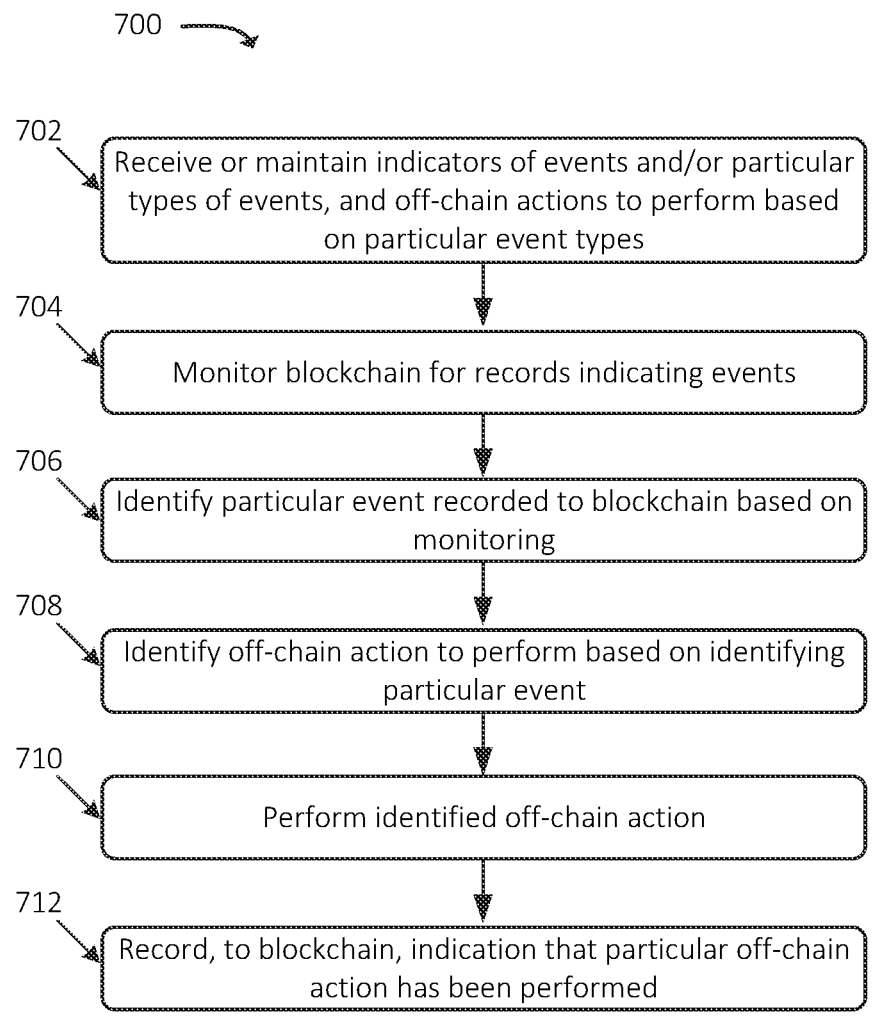
FIG. 7 illustrates an example process for performing one or more off-chain actions based on blockchain events, performing the one or more off-chain actions and recording an indication to the blockchain that the one or more off-chain actions have been performed, in accordance with some embodiments.

FIG. 7 illustrates an example process 700 for performing one or more off-chain actions based on blockchain events, performing the one or more off-chain actions and recording an indication to the blockchain that the one or more off-chain actions have been performed. In some embodiments, some or all of process 700 may be performed by BEOS 101. In some embodiments, one or more other devices may perform some or all of process 700 in concert with, and/or in lieu of, BEOS 101.

As shown, process 700 may include receiving or maintaining (at 702) indicators of events and/or particular types of events. For example, as discussed above, BEOS 101 may receive information that associates one or more flags or other indicators to particular off-chain actions. Additionally, or alternatively, BEOS 101 may receive information that associates particular smart contracts, deployed to blockchain 103, to particular off-chain actions. Additionally, or alternatively, BEOS 101 may receive information associating particular client identifiers to particular off-chain actions. BEOS 101 may further receive information specifying parameters, formatting, etc. associated with each action or type of action.

Process 700 may further include monitoring (at 704) blockchain 103 for records indicating events. For example, BEOS 101 may monitor blockchain 103 periodically or on some other ongoing basis to determine whether events have been recorded to blockchain 103 that match one or more indicators, event types, smart contracts, etc. discussed above. As discussed above, such events may be recorded to blockchain 103 by one or more clients or smart contracts.

Process 700 may additionally include identifying (at 706) a particular event recorded to blockchain 103 based on the monitoring. For example, BEOS 101 may identify a particular record, block, etc. recorded to blockchain 103 that includes an identifier, smart contract, or other type of indicator that matches information associating identifiers, smart contracts, etc. to particular off-chain actions. In some embodiments, the event may include an event identifier, which may include or may be based on a transaction identifier associated with the recording of the event to blockchain 103, and/or may include some other unique identifier provided by a smart contract or client that initiated the recording of the event to blockchain 103. For example, in situations where the action includes a query, such event identifier may be a query identifier associated with the query.

Process 700 may also include identifying (at 708) a particular off-chain action to perform based on identifying the particular event. For example, as discussed above, BEOS 101 may determine the particular off-chain action based on the type of event, based on an identifier of a client or smart contract that initiated the recording of the event to blockchain 103, etc. In some embodiments, such determination may include determining one or more devices or systems to communicate with or configure, one or more devices or systems (e.g., off-chain repositories) to query, etc. The determination may further include identifying parameters of the off-chain action, such as query terms, configuration values for an IoT device, etc. In some embodiments, such determination may be based on the information (received at 702) described above (e.g., indicating particular parameters or formats of parameters associated with different types of off-chain actions).

Process 700 may further include performing (at 710) the identified off-chain action. For example, BEOS 101 may communicate with one or more suitable devices or systems via one or more APIs or other communication pathways. In some embodiments, BEOS 101 may receive a confirmation, acknowledgment, query results, or other feedback from such devices or systems.

Process 700 may additionally include recording (at 712), to blockchain 103, an indication that the particular off-chain action has been performed. For example, BEOS 101 may record such indication, including the event identifier, to blockchain 103. In some embodiments, BEOS 101 may further include additional information in this indication, such as some or all of the acknowledgment, query results, or other feedback received from one or more devices or systems with which BEOS 101 communicated or performed an action on. In some embodiments, including such information may be based on the information (received at 702) indicating the particular events or event types. By including the event identifier, the indication that the action has been completed may be correlated with the event (identified at 706). In this manner, an entity associated with the event, such as a client that initiated the recording of the event to blockchain 103, may have confirmation that the action was performed, and/or may receive information that was requested by initiating the recording of the event to blockchain 103.

Figure 8:
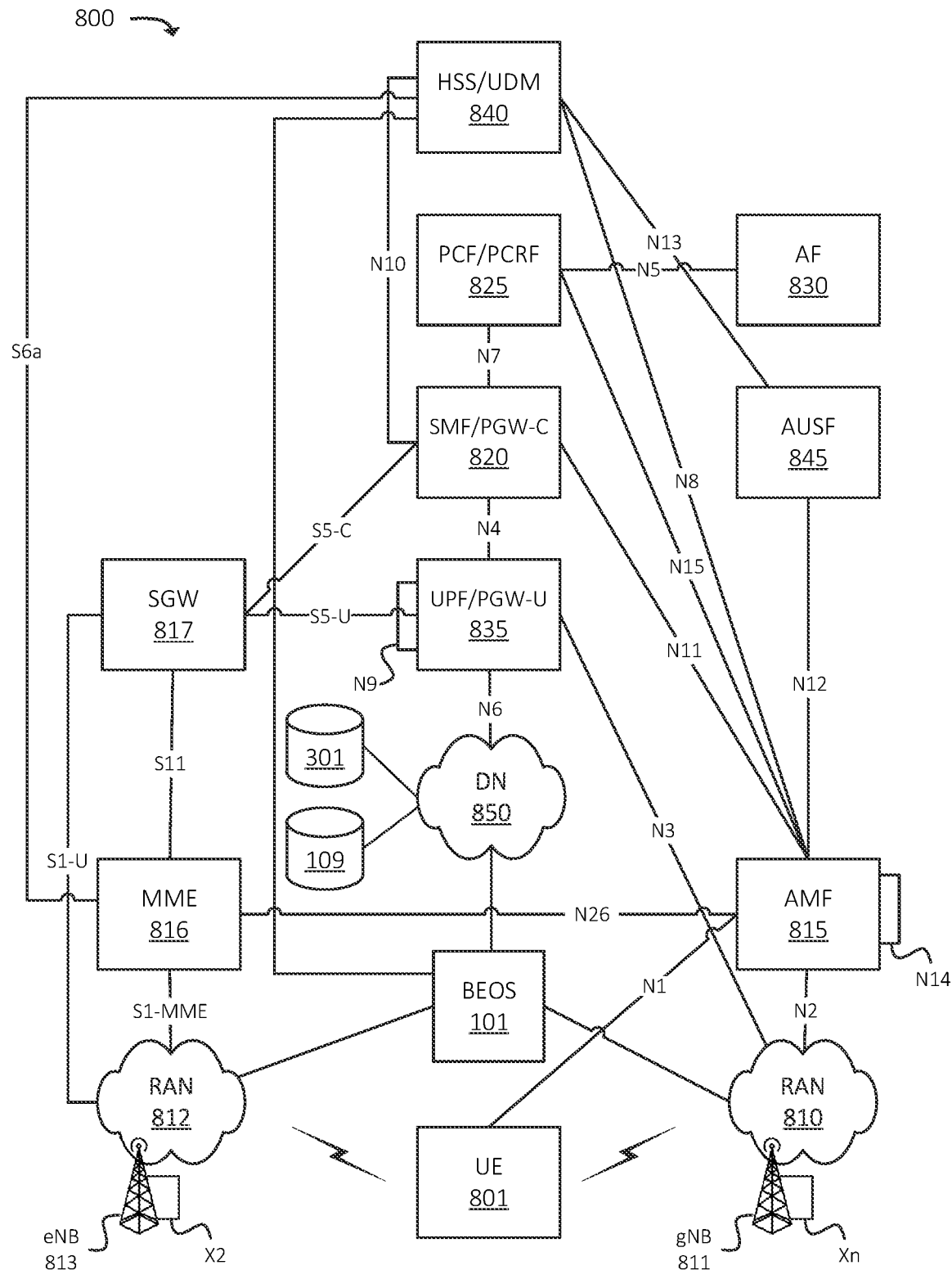
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more Next Generation Node Bs ("gNBs") 811), RAN 812 (which may include one or more evolved Node Bs ("eNBs") 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, and Authentication Server Function ("AUSF") 845. Environment 800 may also include one or more networks, such as Data Network ("DN") 850. Environment 800 may include one or more additional devices or systems communicatively coupled to one or more networks (e.g., DN 850), such as BEOS 101 and/or one or more devices or systems (e.g., nodes, validators, delegators, etc.) implementing one or more blockchains 103 and/or 401.

The example shown in FIG. 8 illustrates one instance of each network component or function (e.g., one instance of SMF/PGW-C 820, PCF/PCRF 825, UPF/PGW-U 835, HSS/UDM 840, and/or AUSF 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or AUSF 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), or another type of mobile computation and communication device. UE 801 may send traffic to and/or receive traffic (e.g., user plane traffic) from DN 850 via RAN 810, RAN 812, and/or UPF/PGW-U 835. In some embodiments, client 107 and/or some or all of blockchains 103 and/or 401 may be, may include, or may be implemented by one or more UEs 801 or other types of suitable devices or systems.

RAN 810 may be, or may include, a 5G RAN that includes one or more base stations (e.g., one or more gNBs 811), via which UE 801 may communicate with one or more other elements of environment 800. UE 801 may communicate with RAN 810 via an air interface (e.g., as provided by gNB 811). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), Cloud-Native Network Functions ("CNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, CNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, CNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, CNFs, etc., that gather, process, store, and/or provide information in a manner described herein. SMF/PGW-C 820 may, for example, facilitate the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, CNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, CNFs, etc., that receive, store, and/or provide information that may be used in determining parameters (e.g., quality of service parameters, charging parameters, or the like) for certain applications.

UPF/PGW-U 835 may include one or more devices, systems, VNFs, CNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, CNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol IP-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
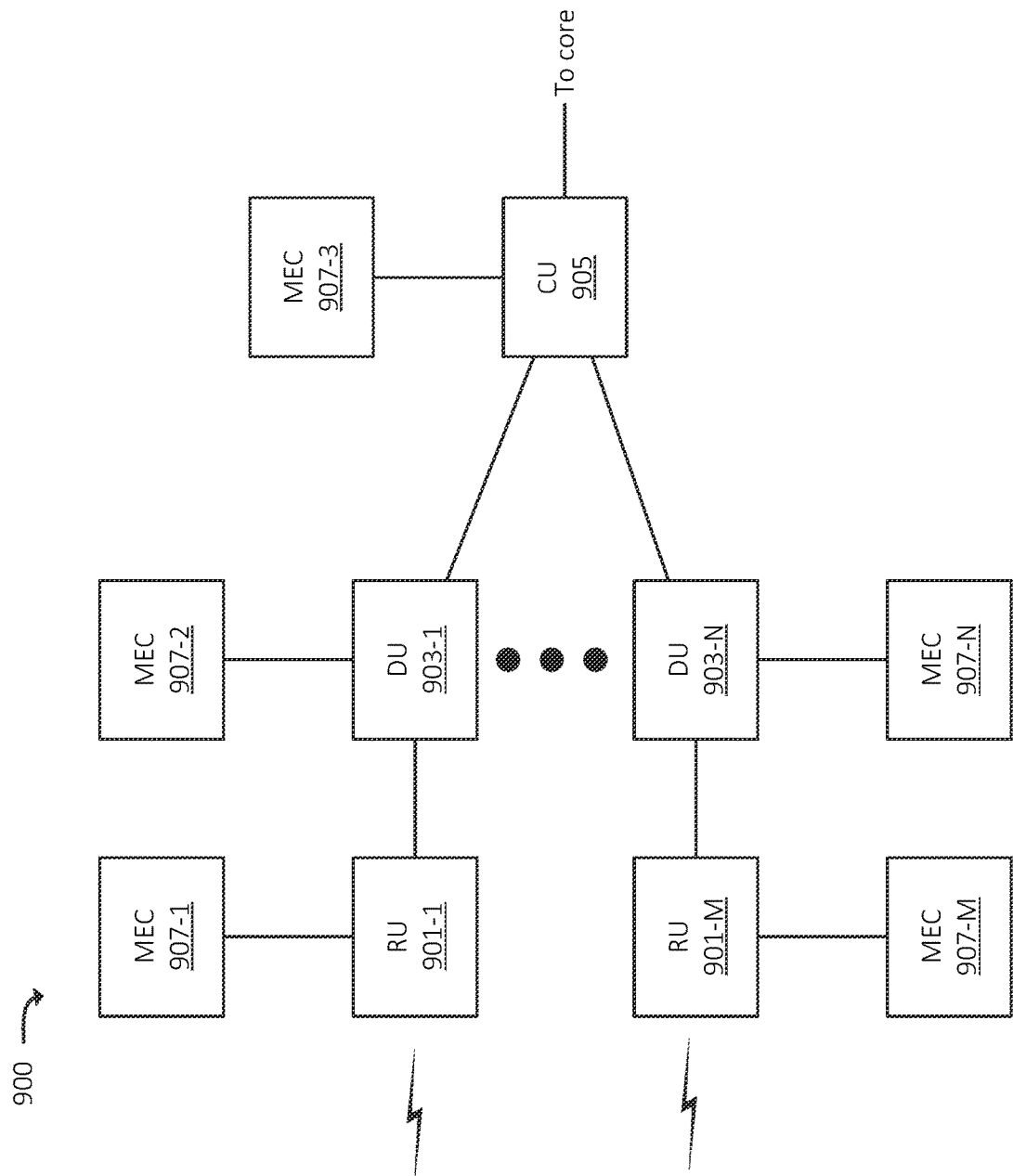
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810, RAN 812, or some other RAN). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 810). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N(referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as "MECs" 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network. In some embodiments, MEC 907 may include, and/or may implement, some or all of the functionality described above with respect to BEOS 101, blockchain 103, blockchain 401, UPF 835, and/or one or more other devices, systems, VNFs, CNFs, etc.

Figure 10:
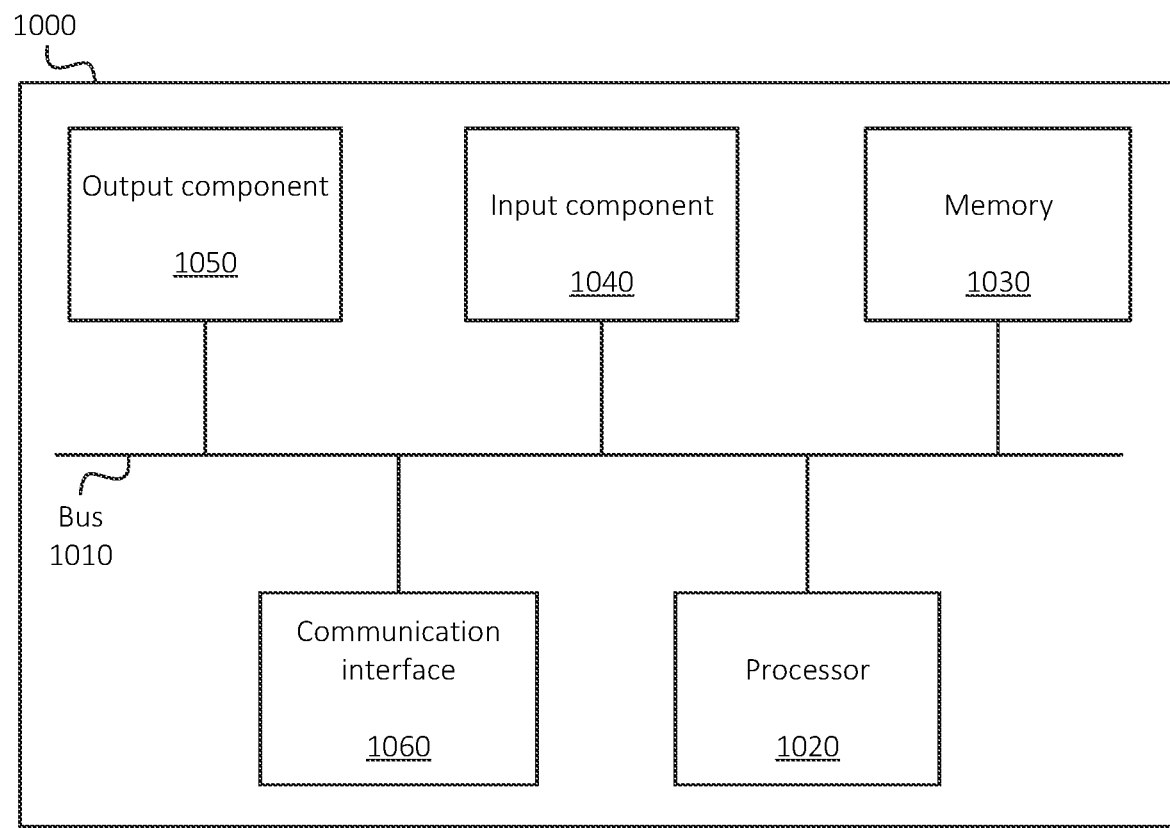
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a plurality of records recorded to a blockchain;
identify a first record of the plurality of records that has been recorded to the blockchain based on a request from a particular entity, wherein the first record includes:
a particular indicator that the first record is associated with a particular event, and
a particular identifier associated with the particular event;
select, based on the particular indicator, a particular type of off-chain action, from a plurality of types of off-chain actions, wherein different types of off-chain actions of the plurality of types of off-chain actions are associated with different indicators;
perform, based on identifying the first record that is associated with the particular event, one or more off-chain actions associated with the particular type of off-chain action; and
record, to the blockchain, a second record that includes:
an indication that the one or more off-chain actions are associated with the particular event and have been performed, and
the particular identifier associated with the particular event,
wherein the first and second records are non-consecutive records of the blockchain,
wherein the particular entity identifies that the second record, including the particular identifier, has been recorded to the blockchain,
wherein the particular entity identifies that the one or more off-chain actions, associated with the particular event, have been performed based on identifying that the second record, including the particular identifier, has been recorded to the blockchain.

2. The device of claim 1, wherein the one or more off-chain actions include outputting a query to an off-chain repository.

3. The device of claim 2, wherein the particular record includes a set of query parameters, wherein outputting the query to the off-chain repository includes outputting the query according to the set of query parameters.

4. The device of claim 3, wherein the set of query parameters includes a set of query terms, wherein outputting the query according to the set of query parameters includes outputting the query with the set of query terms.

5. The device of claim 1, wherein performing the one or more off-chain actions associated with the particular event includes receiving a set of information from a source external to the blockchain,
wherein recording, to the blockchain, the indication that the one or more off-chain actions associated with the particular event have been performed includes recording the received set of information to the blockchain.

6. The device of claim 1, wherein the particular event is associated with a particular client associated with the blockchain, wherein the one or more processors are further configured to:

receive authorization information indicating that the particular client is authorized to request the one or more off-chain actions associated with the particular event; and perform the one or more off-chain actions associated with the particular event based on the authorization information.

7. A non-transitory computer-readable medium, storing a plurality of processor-executable instructions to:
identify a plurality of records recorded to a blockchain;
identify a first record of the plurality of records that has been recorded to the blockchain based on a request from a particular entity, wherein the first record includes:
a particular indicator that the first record is associated with a particular event, and
a particular identifier associated with the particular event;
select, based on the particular indicator, a particular type of off-chain action, from a plurality of types of off-chain actions, wherein different types of off-chain actions of the plurality of types of off-chain actions are associated with different indicators;
perform, based on identifying the first record that is associated with the particular event, one or more off-chain actions associated with the particular type of off-chain action; and
record, to the blockchain, a second record that includes:
an indication that the one or more off-chain actions are associated with the particular event and have been performed, and
the particular identifier associated with the particular event,
wherein the first and second records are non-consecutive records of the blockchain,
wherein the particular entity identifies that the second record, including the particular identifier, has been recorded to the blockchain,
wherein the particular entity identifies that the one or more off-chain actions, associated with the particular event, have been performed based on identifying that the second record, including the particular identifier, has been recorded to the blockchain.

8. The non-transitory computer-readable medium of claim 7, wherein the one or more off-chain actions include outputting a query to an off-chain repository.

9. The non-transitory computer-readable medium of claim 8, wherein the particular record includes a set of query parameters, wherein outputting the query to the off-chain repository includes outputting the query according to the set of query parameters.

10. The non-transitory computer-readable medium of claim 9, wherein the set of query parameters includes a set of query terms, wherein outputting the query according to the set of query parameters includes outputting the query with the set of query terms.

11. The non-transitory computer-readable medium of claim 7, wherein performing the one or more off-chain actions associated with the particular event includes receiving a set of information from a source external to the blockchain,
wherein recording, to the blockchain, the indication that the one or more off-chain actions associated with the particular event have been performed includes recording the received set of information to the blockchain.

12. The non-transitory computer-readable medium of claim 7, wherein the particular event is associated with a particular client associated with the blockchain, wherein the plurality of processor-executable instructions further include processor-executable instructions to:
receive authorization information indicating that the particular client is authorized to request the one or more off-chain actions associated with the particular event; and
perform the one or more off-chain actions associated with the particular event based on the authorization information.

13. A method, comprising:
identifying a plurality of records recorded to a blockchain;
identifying a first record of the plurality of records that has been recorded to the blockchain based on a request from a particular entity, wherein the first record includes:
a particular indicator that the first record is associated with a particular event, and
a particular identifier associated with the particular event;
selecting, based on the particular indicator, a particular type of off-chain action, from a plurality of types of off-chain actions, wherein different types of off-chain actions of the plurality of types of off-chain actions are associated with different indicators;
performing, based on identifying the first record that is associated with the particular event, one or more off-chain actions associated with the particular type of off-chain action; and
recording, to the blockchain, a second record that includes:
an indication that the one or more off-chain actions are associated with the particular event and have been performed, and
the particular identifier associated with the particular event,
wherein the first and second records are non-consecutive records of the blockchain,
wherein the particular entity identifies that the second record, including the particular identifier, has been recorded to the blockchain,
wherein the particular entity identifies that the one or more off-chain actions, associated with the particular event, have been performed based on identifying that the second record, including the particular identifier, has been recorded to the blockchain.

14. The method of claim 13, wherein the one or more off-chain actions include outputting a query to an off-chain repository.

15. The method of claim 14, wherein the particular record includes a set of query terms, wherein outputting the query to the off-chain repository includes outputting the query with the set of query terms.

16. The method of claim 13, wherein performing the one or more off-chain actions associated with the particular event includes receiving a set of information from a source external to the blockchain,
wherein recording, to the blockchain, the indication that the one or more off-chain actions associated with the particular event have been performed includes recording the received set of information to the blockchain.

17. The method of claim 13, wherein the particular event is associated with a particular client associated with the blockchain, wherein the method further comprises:

receiving authorization information indicating that the particular client is authorized to request the one or more off-chain actions associated with the particular event; and performing the one or more off-chain actions associated with the particular event based on the authorization information.

18. The method of claim 13, wherein the plurality of types of off-chain actions include modifying configuration parameters of one or more Internet of Things ("IoT") devices.

19. The device of claim 1, wherein the plurality of types of off-chain actions include at controlling a drone.

20. The non-transitory computer-readable medium of claim 7, wherein the plurality of types of off-chain actions include modifying configuration parameters of a wireless network.

* * * * *